3,198,122
PORTABLE PUMPING STATION
Donald E. Lippke and Clifford J. Kinsey, Delavan, Wis., assignors, by mesne assignments, to Sta-Rite Products, Inc., Delavan, Wis., a corporation of Wisconsin
Filed Dec. 4, 1961, Ser. No. 156,833
4 Claims. (Cl. 103—25)

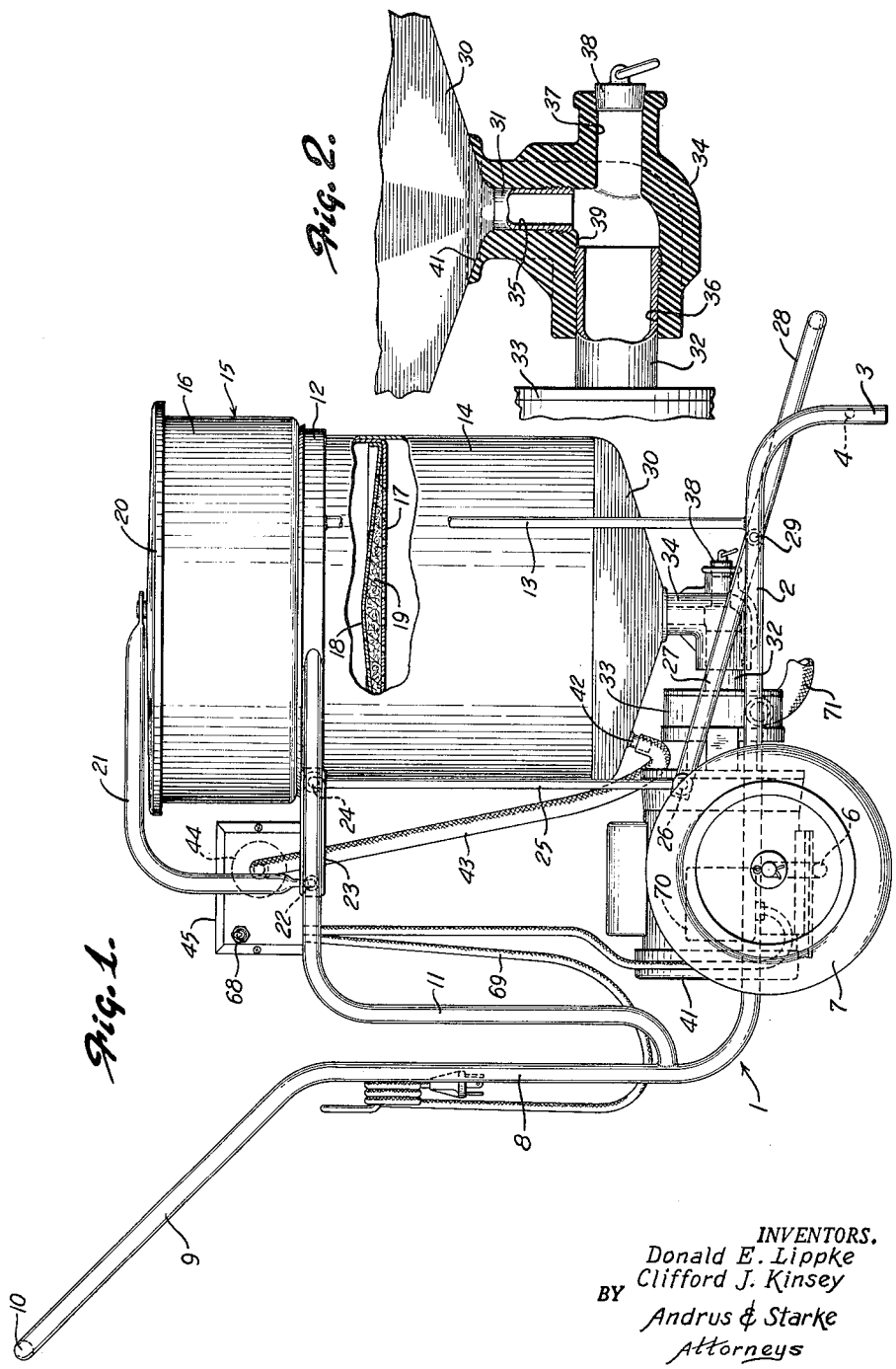

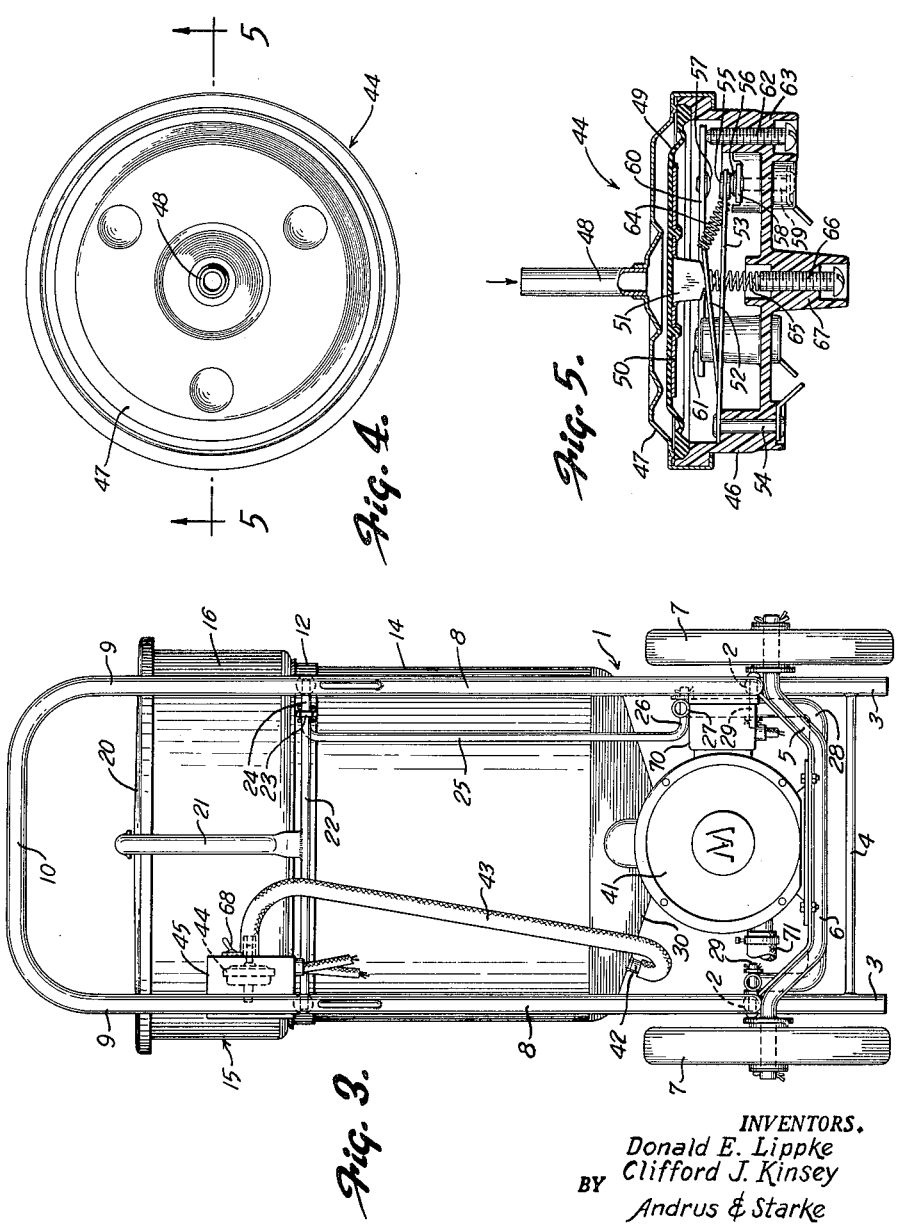

This invention relates to a milk transfer system and more particularly to a portable pumping station.

In a bucket milking system, milk is drawn from the teat cup assemblies to a bucket which is either suspended from the cow or rests on the floor. Rather than carry each bucket to the bulk milk tank, which may be located a substantial distance from the milking area, a portable pumping station is employed and as each bucket is filled, it is dumped into the pumping station which is connected by a long hose to the milk storage tank. The pump is then operated to conduct the milk through the hose or rigid pipe line to the storage tank.

In some portable pumping stations the milk level is controlled by an automatic liquid level control and as the milk rises to a predetermined level within the tub or container, the pump is actuated to pump the milk through the hose to the bulk storage tank. The liquid level control in most cases takes the form of a pair of electrical probes or contacts which are located within the container. When the milk rises to a predetermined level the electric circuit is completed to operate the pump.

In other portable pumping stations a timer control is employed in which the pump is operated at predetermined, timed intervals.

The present invention is directed to an improved portable pumping station which includes a novel, pressure responsive, liquid level control. According to the invention, the device comprises a movable frame and a tub or container is mounted on the frame. The tub is adapted to receive the milk and is provided with a tiltable cover which can be tilted to the open position by operation of a foot treadle.

The milk is drained from the bottom of the tub through an outlet pipe which is connected by a resilient T fitting to the inlet of a pump. The T fitting includes an inspection opening, normally enclosed by a rubber plug, which enables the corners of the T to be visually inspected after the milking operation to thereby insure that the entire T has been cleaned of milk.

To control the liquid level a flexible tube or hose is connected to an outlet opening adjacent the bottom of the tub. The tube is filled with air and extends upwardly outside of the tub and is connected to a pressure responsive switch mechanism which is operably connected to the pump motor. As the level of the milk rises within the tub, the air within the tube is compressed and when the pressure of the air within the tube reaches a predetermined setting, the switch mechanism closes to start the pump and pump the milk from the tub. As the liquid level lowers and the pressure in the tube decreases, the switch mechanism opens to stop the pump.

The liquid level control, which comprises the air filled tube located on the exterior of the tub, provides an accurate level sensing device which eliminates the necessity of seals and openings in the tub or cover. To meet the sanitary code requirements, all portions of the pumping station which come in contact with the milk must be thoroughly cleaned after each milking operation. The liquid level control mechanism of the invention greatly simplifies the cleaning operation for it can be more readily cleaned than conventional liquid level controls. To clean the pumping station, the pump outlet hose is inserted within the tub, and the upper end of the air pressure tube is disconnected from the pressure responsive switch mechanism and inserted within the inspection opening in the T fitting. By operating the pump, a wash liquid contained in the tube is circulated through the air pressure tube to the pump to thereby clean the tube, and the wash liquid is circulated by the pump through the hose back to the tub.

Other objects and advantages will appear in the course of the following description.

The drawings illustrate the best mode presently contemplated of carrying out the invention.

In the drawings:

FIG. 1 is a side elevation with parts broken in section of the portable pumping station of the invention;

FIG. 2 is a vertical section showing the fitting which connects the outlet of the tub with the pump;

FIG. 3 is an end view of the apparatus;

FIG. 4 is a plan view of the pressure responsive switch mechanism; and

FIG. 5 is a section taken along line 5—5 of FIG. 4.

The drawings illustrate a portable pumping station for a bucket milking system comprising a frame 1 which includes a pair of spaced side members 2. The forward ends of the side members are bent downwardly at 3 and are adapted to engage the floor or ground to provide a support for the unit. The forward portions of the side members 2 are connected together by a bar 4.

An axle 5 is secured to the side members 2 and is provided with a central dropped portion 6. Wheels 7 are journaled on the ends of the axle 5 and enable the unit to be freely moved across the ground.

The rear portions of the side members 2 are bent upwardly at 8 and the upper ends 9 of the side members are bent at an angle to the vertical portions 8 and the outer extremity of the portions 9 are connected by a cross member 10 which provides a handle for the unit.

A pair of generally L-shaped members 11 are connected to the vertical portions 8 of the side members and extend over the side members. The forward ends of the L members 11 are secured to a generally circular rim or band 12 and the rim is connected to the side members 2 by a series of vertical supports 13.

The rim 12 supports a tub 14 or container which is adapted to contain the milk, and the upper edge of the tub is provided with an outwardly extending flange which rests on the rim. The upper end of the tub 14 is enclosed by a receiving container 15. The milk is adapted to be dumped into the container 15 and passes downwardly through the perforated bottom wall of the container into the tub.

The container 15 includes an enlarged upper portion 16 which rests on rim 12, and a lower portion 17 having a reduced diameter which fits inside of the tub 14. The container 15 is provided with a perforated false bottom 18 which is spaced above the bottom wall of the container and a filter pad 19 is located therebetween and serves to filter the milk which passes downwardly into the tub 14.

The open upper end of the container 15 is enclosed by a tiltable cover 20 which is carried by an L-shaped arm 21. The lower end of the vertical portion of the arm 21 is connected to a horizontal rod 22 and the ends of the rod are journaled within openings in the members 11. A link 23 is connected to the rod 22 and the forward end of the link is pivotally connected to the bent end 24 of a vertical rod 25.

The bent lower end 26 of the rod 25 is pivotally connected to one of the arms 27 of a generally U-shaped treadle 28. The central portion of the treadle 28 is connected by pins 29 to the side members 2. By stepping on the forward end of the treadle 28, the treadle 28 is pivoted about the pins 29 which thereby acts through rod 25 to pivot the link 23 about the rod 22. Pivoting of rod 22 causes the arm 21 to pivot upwardly to raise the cover 20 from the container 15.

The tub 14 is provided with a sloped or generally conical bottom surface 30 and an outlet pipe 31 is located at the central portion of the surface 30. The outlet pipe 31 is connected to the inlet 32 of a pump 33 by a resilient or rubber T fitting 34. As best shown in FIG. 2, the outlet pipe 31 is secured within a vertical opening 35 in the T, while the inlet pipe 32 of the pump is secured within a horizontal opening 36 in the fitting. Both the outlet pipe 31 and inlet pipe 32 are provided with barbs or other surface deviations which increase the sealing effect between the pipes and the fitting.

In addition to the openings 35 and 36, the fitting is also provided with a second horizontal inspection opening 37 which is in alignment with the opening 36. The opening 37 is normally closed off by a resilient plug 38. The opening 37 can be used for inspection of the interior surfaces of the T to insure that the interior surfaces, and particularly the corner 39, have been adequately cleaned and are free of milk or other contamination.

The upper surface 40 of the T is tapered and conforms to the lower surface 30 of the tub so as to provide an effective seal between the T and the tub.

To operate the pump 33 a motor 41 is mounted on the dropped portion 6 of the axle and is operably connected to the pump to drive the same.

To automatically control the milk level in the tub 14, the lower portion of the tub is provided with an outlet nipple 42 and a tube 43 is connected to the nipple 42 and extends along the outside of the tub and is operably connected to a pressure responsive switch mechanism 44 contained within the housing 45. The tube 43 is normally filled with air and as the liquid level rises within the tub, the air within the tube 43 will be compressed and the increase in pressure within the tube 43 will serve to automatically actuate the pump motor 41 when the pressure reaches a predetermined value.

The pressure responsive switch mechanism 44 is a conventional type and includes an outer casing 46 having an open end which is enclosed by a cover 47. A nipple 48 is secured within a central opening in the cover and is connected to the tube 43.

A flexible diaphragm 49 or other pressure responsive member is secured across the casing 46 and is stiffened by a plate 50 which is secured to the central portion of the diaphragm. The plate 50 carries a fin-like projection 51 which extends through a slot in the central arm 52 of a snap switch 53. One end of the switch 53 is connected to a terminal 54 while the other end of the switch is provided with a contact 55 which moves between two stationary contacts 56 and 57. In the illustrated device the contact 56 is dead and is secured to one end of a lower contact arm 58 and the other end of the arm 58 is secured to a terminal 59. The contact 57, which is a live contact, is secured to one end of an upper contact arm 60 and the opposite end of arm 60 is connected to terminal 61. The terminal 54 is connected to a suitable source of electrical power while the terminal 61 is connected to the pump motor.

The position of the upper contact 57 can be adjusted by means of the set screw 62 which is threadedly engaged within a boss 63 in the casing. By threading the screw inwardly the distance between contacts 56 and 57 will be increased.

A coil spring 64 connects the end of the central arm 52 with the contact 55 and serves to provide a snap action for the switch 53. A further adjustment is provided by a coil spring 65 which engages the tip of the projection 51. The other end of the spring 65 is seated on the end of an adjustable bolt 66 which is threaded within boss 67. The adjustment provided by bolt 66 enables the switch element 53 to return to contact 56 at a different pressure value than that which is required to move the switch from contact 56 to contact 57.

In operation, as the pressure within the tube 43 increases as the milk level rises, the diaphragm will flex and when the pressure builds up to a predetermined value, the contact 55 of switch 53 will snap into engagement with contact 57, thereby completing the circuit to the pump motor and starting the pump. Operation of the pump will lower the liquid level within the tub 14 and as the liquid level lowers, the pressure within the tube 43 will correspondingly decrease. When the pressure within the tube reaches a predetermined value, which is less than the pressure required to start the pump, the contact 55 of switch 53 will snap into engagement with the dead contact 56 to stop the pump. By adjustment of the screws 62 and 66 the liquid levels at which the pump will start and stop can be readily adjusted. In most cases the minimum level at which the pump will stop operation is generally above the level of the outlet nipple 42. However, it is not essential that the minimum liquid level be above the nipple 42.

In addition to the pressure responsive switch mechanism, a bypass switch 68 is located in the housing 45 and the switch 68 serves to bypass the pressure responsive switch mechanism 44. In one position the switch 68 will maintain the pressure responsive switch mechanism 44 in the circuit, and in the other position will shunt out the switch mechanism so that the pump will operate continually. The switch 68 is normally used at the completion of the milking operation when it is desired to completely drain the tub 14 of milk by using the pump. The operator can then switch the switch 68 to the continually "on" position to drain all of the milk from the tub 14. The switch 68 is also employed in the cleaning operation when it is desired to have the pump operate continuously.

Electrical power is supplied to the unit by the conduit 69 which connects the pressure responsive switch mechanism 44 to the junction box 70 of the motor.

During the milking operation using either a suspended bucket or floor bucket, the milk is dumped from each individual bucket into the receiving container 15 and passes downwardly through the filter pad 19 into the tub 14. As the liquid level rises within the tub, the pressure within the tube 43 will be increased and when the pressure has increased to a predetermined value the pump will automatically operate to pump the milk from the tub through hose 71 to the bulk storage tank. When the liquid level reaches a minimum level the pump will automatically stop and this automatic pump operation is repeated throughout the milking operation.

After the milking operation has been completed, it is necessary to clean all parts of the apparatus which have been in contact with the milk in order to satisfy the sanitary code requirements. To begin the cleaning operation, the free end of the hose 71, which is connected to the outlet of the pump 33, is inserted within the receiving container 15 and the tub 14 is filled with a suitably quantity of water and detergent and/or sanitizer. The tube 43 is disconnected from the switch mechanism 44 and is instead inserted within the inspection opening 37 in the T fitting 34. The switch 68 is then moved to the continually "on" position so that the pump 33 will operate to pump water through the discharge hose 71 into the receiver 15 and water will be drawn both through the outlet 31 of the tub and through the tube 43 to the pump to provide a continuous circulation for the cleaning liquid.

With the present construction the liquid level tube 43 can be readily cleaned without entirely removing the tube from the apparatus but by merely inserting the upper end of the tube into the inspection opening in the fitting. This greatly simplifies the cleaning operation of the tube.

The opening 37 not only serves as an inlet for the tube 43 during the cleaning operation, but also serves as a visual inspection opening so that it can be readily seen whether all the interior surfaces of the fitting 34 have been cleaned during the washing operation.

The liquid level control which is provided by the tube 43 and switch mechanism 44 is of simple structure which accurately controls the liquid level within the tub. As the entire mechanism is located outside of the tub, the device eliminates the need for sealed conduits in the cover or other portions of the tub and thereby simplifies the initial cost and maintenance of the apparatus.

Various modes of carrying out the invention are contemplated as being within the scope of the following claims particularly pointing out and distinctly claiming the subject matter regarded as the invention.

We claim:

1. A portable pumping station for a milking system, comprising
   (a) a tub to contain the milk,
   (b) outlet conduit means connected to the bottom portion of the tub for conducting milk from the tub,
   (c) flexible presure conduit means having a first end communicating with the lower portion of the tub and having an opposite end located at a higher level than the first end, said pressure conduit means being located on the exterior of said tub,
   (d) pumping means,
   (e) inlet conduit means communicating with the pumping means,
   (f) a fitting having a first opening to receive said outlet conduit means and having a second opening to receive said inlet conduit means, said fitting also having a third opening communicating with said first and second openings and aligned with said second opening, said third opening having a size to properly receive said pressure conduit means whereby during the cleaning operation said opposite end of said pressure conduit means is inserted within said third opening, and
   (g) pressure responsive means operably connected to said pumping means and responsive to the pressure within said pressure conduit means for starting said pumping means when the milk level rises to a predetermined level in said tub.

2. In a portable pumping station for a milking system, a movable frame, a tub to contain milk mounted on the movable frame and having an inlet opening therein, outlet conduit means connected to the bottom portion of the tub for conducting milk from the tub, pumping means connected to the outlet conduit means for conveying milk through said outlet conduit means to a storage location, closed conduit means containing a compressible gas and having one end communicating with the lower portion of the tub and being unobstructed to permit free flow of milk therein, a flexible pressure-responsive member located at the upper end of the tub and closing off the opposite end of said closed conduit means and disposed in contact with said gas and adapted to be flexed by variations in the pressure of the gas within said closed conduit means, and switch means carried by the frame adjacent the upper end of the tub and connected in an electrical circuit with a source of power and said pumping means and operably connected to said pressure-responsive member and responsive to a first pressure within said closed conduit means for operating said pumping means and responsive to a second pressure within said closed conduit means for shutting off said pumping means, said second pressure being substantially less than the first pressure whereby said switch means will not shut off the pump until the milk has been substantially drained from the tub.

3. A portable pumping station for a milking system, comprising a tub to contain milk, pump means, outlet conduit means connected to the bottom portion of the tub for conducting milk from the tub, flexible pressure conduit means having one end communicating with the lower portion of the tub, pump conduit means for supplying milk to said pump means, a fitting having a first opening conected to said outlet conduit means having a second opening communicating with said pump conduit means, said fitting also having a third opening communicating with said first and second openings and said third opening having a size to be properly connected to said pressure conduit means whereby during the cleaning operation the opposite end of said pressure conduit means is conected within said third opening, and pressure-responsive means operably connected to the pumping means and responsive to the pressure within said pressure conduit means for starting said pumping means when the milk rises to a predetermined level in the tub.

4. In a portable pumping station for a milking system, a movable frame, a tub to contain milk mounted on the movable frame and having an inlet opening therein, outlet conduit means connected to the bottom portion of the tub for conducting milk from the tub, pumping means connected to the outlet conduit means for conveying milk through said outlet conduit to a storage location, closed conduit means containing a compressible gas and having one end communicating with the lower portion of the tub, a flexible pressure responsive member located at the upper end of the tub and closing off the opposite end of said closed conduit means and disposed in contact with said gas and adapted to be flexed by variations in pressure of the gas within said closed conduit means, and means carried by the frame adjacent the upper end of the tub and operably connected to the pressure-responsive member for operating the pump when the pressure of the gas in said closed conduit means increases to a first predetermined value and for shutting off the pump when the pressure of the gas in said closed conduit means decreases to a second predetermined value substantially lower than said first value.

References Cited by the Examiner

UNITED STATES PATENTS

| 1,511,432 | 10/24 | Skidmore | 103—25 |
| 1,643,239 | 9/27 | Drabing. | |
| 1,987,466 | 1/35 | Collin | 103—25 |
| 2,102,304 | 12/37 | Charbonneau | 103—25 |
| 2,136,776 | 11/38 | Pugatz. | |
| 2,678,752 | 5/54 | West. | |
| 3,019,764 | 2/62 | Schilling. | |
| 3,070,021 | 12/62 | Tutthill | 103—25 |

FOREIGN PATENTS 469,504  3/52  Italy.

LAURENCE V. EFNER, *Primary Examiner.*